US012615284B2

(12) United States Patent
Keyerleber et al.

(10) Patent No.: US 12,615,284 B2
(45) Date of Patent: Apr. 28, 2026

(54) OPTIMIZING NETWORK TRAFFIC OBFUSCATION BASED ON AGGREGATED NETWORK PERFORMANCE

(71) Applicant: SCATR, Corp., Sheridan, WY (US)

(72) Inventors: John P. Keyerleber, Richmond Heights, OH (US); Adam Uccello, Austin, TX (US)

(73) Assignee: SCATR, CORP, Cleveland, OH (US)

( * ) Notice: Subject to any disclaimer, the term of this patent is extended or adjusted under 35 U.S.C. 154(b) by 266 days.

(21) Appl. No.: 18/421,967

(22) Filed: Jan. 24, 2024

(65) Prior Publication Data

US 2025/0240320 A1 Jul. 24, 2025

(51) Int. Cl.
H04L 9/40 (2022.01)
(52) U.S. Cl.
CPC ................................. H04L 63/1441 (2013.01)
(58) Field of Classification Search
CPC .................................................... H04L 63/1441
See application file for complete search history.

(56) References Cited

U.S. PATENT DOCUMENTS

| | | |
|---|---|---|
| 6,502,135 B1 | 12/2002 | Munger et al. |
| 6,765,866 B1 | 7/2004 | Wyatt |
| 6,990,111 B2 | 1/2006 | Lemoff et al. |
| 7,382,782 B1 | 6/2008 | Ferguson et al. |
| 7,697,528 B2 | 4/2010 | Parry et al. |
| 7,782,782 B1 | 8/2010 | Ferguson et al. |
| 7,895,348 B2 | 2/2011 | Twitchell, Jr. |
| 7,984,495 B1 | 7/2011 | Aravind |

(Continued)

FOREIGN PATENT DOCUMENTS

| | | |
|---|---|---|
| CN | 112333152 A | 2/2021 |
| EP | 3651407 A1 | 11/2024 |

(Continued)

OTHER PUBLICATIONS

Notice of Allowance dated Jun. 11, 2024, U.S. Appl. No. 18/194,413, filed Mar. 31, 2023.

(Continued)

*Primary Examiner* — Barbara B Anyan
(74) *Attorney, Agent, or Firm* — Neo IP

(57) ABSTRACT

In some examples, a method includes receiving, from a plurality of agents executing on scatter network devices, network performance metrics, at least some of the scatter network devices serving as endpoints for logical communication channels formed via a communication channel provider for which a first Internet service provider provides Internet backhaul and the logical communication channels traverse a first relay; aggregating the network performance metrics received from the plurality of agents; analyzing the aggregated network performance metrics to determine operational characteristics of a network; determining, based on the operational characteristics of the network, that the Internet service provider has transitioned from the first Internet service provider to a second Internet service provider to provide the Internet backhaul; and responsive to the determining, providing an instruction to the plurality of agents to modify operational settings of the agents to form logical communication channels that traverse a second relay.

20 Claims, 5 Drawing Sheets

(56) References Cited

U.S. PATENT DOCUMENTS

| | | | |
|---|---|---|---|
| 8,274,980 | B2 | 9/2012 | Sato et al. |
| 8,358,658 | B2 | 1/2013 | Flynn et al. |
| 8,416,686 | B2 | 4/2013 | Ferguson et al. |
| 8,924,716 | B2 | 12/2014 | Miyabayashi et al. |
| 8,955,110 | B1 | 2/2015 | Twitchell, Jr. |
| 9,116,734 | B1 | 8/2015 | Twitchell, Jr. et al. |
| 9,185,046 | B2 | 11/2015 | Ferguson et al. |
| 9,225,699 | B2 | 12/2015 | Biradar et al. |
| 9,241,026 | B2 | 1/2016 | Twitchell |
| 9,495,194 | B1 | 11/2016 | Twitchell, Jr. et al. |
| 9,535,805 | B2 | 1/2017 | Ananthanarayanan et al. |
| 9,629,063 | B2 | 4/2017 | Brown et al. |
| 9,794,797 | B2 | 10/2017 | Hoffberg |
| 10,356,061 | B2 | 7/2019 | Fiske |
| 10,432,526 | B2 | 10/2019 | Gafni et al. |
| 10,469,375 | B2 | 11/2019 | Twitchell, Jr. |
| 10,541,907 | B2 | 1/2020 | Twitchell, Jr. et al. |
| 10,637,685 | B2 | 4/2020 | Goel et al. |
| 10,686,729 | B2 | 6/2020 | Sindhu et al. |
| 10,715,327 | B1 | 7/2020 | Ramanujan et al. |
| 10,826,711 | B2 | 11/2020 | Barry |
| 10,826,876 | B1 | 11/2020 | Sinn et al. |
| 10,833,972 | B2 | 11/2020 | Vaughan et al. |
| 10,904,367 | B2 | 1/2021 | Goel et al. |
| 10,965,586 | B2 | 3/2021 | Goel et al. |
| 11,153,276 | B1 | 10/2021 | Keyerleber |
| 11,171,934 | B2 | 11/2021 | Fiske |
| 11,178,262 | B2 | 11/2021 | Goel et al. |
| 11,184,147 | B2 | 11/2021 | Ghorbani |
| 11,381,557 | B2 | 7/2022 | Kim et al. |
| 11,469,922 | B2 | 10/2022 | Goel et al. |
| 11,533,617 | B2 | 12/2022 | Mihelich et al. |
| 11,558,422 | B2 | 1/2023 | Twitchell, Jr. et al. |
| 11,601,359 | B2 | 3/2023 | Goel et al. |
| 11,637,694 | B2 | 4/2023 | Islamov |
| 11,777,839 | B2 | 10/2023 | Sindhu et al. |
| 11,805,127 | B1 | 10/2023 | Sundar et al. |
| 11,895,015 | B1 | 2/2024 | Budhia et al. |
| 12,021,972 | B2 | 6/2024 | Wang et al. |
| 12,120,028 | B1 | 10/2024 | Andrews et al. |
| 12,335,160 | B2 | 6/2025 | Andrews et al. |
| 2001/0050914 | A1 | 12/2001 | Akahane et al. |
| 2001/0054158 | A1 | 12/2001 | Jarosz |
| 2002/0191797 | A1 | 12/2002 | Perlman |
| 2003/0112755 | A1 | 6/2003 | McDysan |
| 2004/0103205 | A1 | 5/2004 | Larson et al. |
| 2006/0008082 | A1 | 1/2006 | Gluck et al. |
| 2007/0217424 | A1 | 9/2007 | Kim et al. |
| 2010/0149988 | A1 | 6/2010 | Matsubara et al. |
| 2011/0179136 | A1 | 7/2011 | Twitchell, Jr. |
| 2011/0271096 | A1 | 11/2011 | Bharrat et al. |
| 2012/0204032 | A1 | 8/2012 | Wilkins et al. |
| 2014/0115341 | A1 | 4/2014 | Robertson |
| 2015/0326603 | A1 | 11/2015 | Deisinger et al. |
| 2015/0350245 | A1 | 12/2015 | Twitchell, Jr. et al. |
| 2015/0350246 | A1 | 12/2015 | Bergman |
| 2016/0065370 | A1 | 3/2016 | Le Saint et al. |
| 2016/0119291 | A1 | 4/2016 | Zollinger et al. |
| 2016/0255054 | A1 | 9/2016 | Wan et al. |
| 2017/0019256 | A1 | 1/2017 | Rhelimi |
| 2017/0033925 | A1 | 2/2017 | DeNeut et al. |
| 2017/0126626 | A1 | 5/2017 | Datta et al. |
| 2017/0149740 | A1 | 5/2017 | Mansour et al. |
| 2017/0331794 | A1 | 11/2017 | Lokman et al. |
| 2017/0372048 | A1 | 12/2017 | Liu et al. |
| 2018/0316598 | A1 | 11/2018 | Twitchell, Jr. |
| 2018/0375663 | A1 | 12/2018 | Le Saint et al. |
| 2019/0014092 | A1 | 1/2019 | Malek et al. |
| 2019/0294464 | A1 | 9/2019 | Twitchell, Jr. et al. |
| 2019/0373458 | A1 | 12/2019 | Dandekar et al. |
| 2020/0014619 | A1 | 1/2020 | Shelar et al. |
| 2020/0154272 | A1 | 5/2020 | Uy et al. |
| 2020/0195439 | A1 | 6/2020 | Suresh et al. |
| 2020/0211002 | A1 | 7/2020 | Steinberg |
| 2020/0213111 | A1 | 7/2020 | Leavy et al. |
| 2020/0213151 | A1 | 7/2020 | Srivatsan et al. |
| 2020/0226258 | A1 | 7/2020 | Nix |
| 2020/0259640 | A1 | 8/2020 | Leavy et al. |
| 2021/0051146 | A1 | 2/2021 | Stolbikov et al. |
| 2021/0105301 | A1 | 4/2021 | Anderson et al. |
| 2021/0144004 | A1 | 5/2021 | Gray et al. |
| 2021/0168138 | A1 | 6/2021 | Paruchuri |
| 2021/0184854 | A1 | 6/2021 | Pizot et al. |
| 2021/0297351 | A1 | 9/2021 | Vegesna et al. |
| 2021/0328779 | A1 | 10/2021 | Ruan |
| 2021/0328976 | A1 | 10/2021 | Leavy et al. |
| 2021/0352471 | A1 | 11/2021 | Hallock |
| 2021/0360026 | A1 | 11/2021 | Anderson et al. |
| 2022/0247678 | A1 | 8/2022 | Atwal et al. |
| 2022/0392286 | A1 | 12/2022 | Elrad et al. |
| 2023/0006993 | A1 | 1/2023 | Bilgin et al. |
| 2023/0097712 | A1 | 3/2023 | Sullivan et al. |
| 2023/0164086 | A1 | 5/2023 | York et al. |
| 2023/0188347 | A1 | 6/2023 | Sarin |
| 2023/0198914 | A1 | 6/2023 | Ranjan et al. |
| 2023/0208748 | A1 | 6/2023 | Goel et al. |
| 2024/0007367 | A1 | 1/2024 | Demchenko |
| 2024/0028367 | A1 | 1/2024 | Mathew et al. |
| 2024/0214803 | A1 | 6/2024 | Dandekar et al. |
| 2024/0275596 | A1 | 8/2024 | Stolbikov et al. |
| 2024/0380726 | A1 | 11/2024 | Ban et al. |
| 2025/0240320 | A1 * | 7/2025 | Keyerleber ......... H04L 63/1441 |

FOREIGN PATENT DOCUMENTS

| | | | |
|---|---|---|---|
| WO | 2018160863 | A1 | 9/2018 |
| WO | 2023134844 | A1 | 7/2023 |

OTHER PUBLICATIONS

Office Action dated Nov. 27, 2024, U.S. Appl. No. 18/345,829, filed Jun. 30, 2023.

Syed, et al., "Zero Trust Architecture (ZTA): A Comprehensive Survey", IEEE Access—Digital Object Identifier, vol. 10, 37 pages, 2022.

Shu, et al., "Secure Data Collection in Wireless Sensor Networks Using Randomized Dispersive Routes", IEEE Transactions on Mobile Computing, vol. 9, No. 7, Jul. 2010, 14 pages.

Andrews, John G., et al., "Secure Data Routing With Channel Resiliency," filed Sep. 11, 2024, U.S. Appl. No. 11/882,552.

Notice of Allowance dated Feb. 21, 2025, U.S. Appl. No. 18/345,847, filed Jun. 30, 2023.

Office Action dated Apr. 23, 2025, U.S. Appl. No. 18/361,721, filed Jul. 28, 2023.

Office Action dated May 7, 2025, U.S. Appl. No. 18/345,819, filed Jun. 30, 2023.

Notice of Allowance dated May 20, 2025, U.S. Appl. No. 18/345,829, filed Jun. 30, 2023.

Office Action dated Jul. 11, 2025, U.S. Appl. No. 18/345,837, filed Jun. 30, 2023.

Notice of Allowance dated Jun. 22, 2021, U.S. Appl. No. 16/683,146, filed Nov. 13, 2019.

Office Action dated Apr. 12, 2023, U.S. Appl. No. 17/481,914, filed Sep. 22, 2022.

Final Office Action dated Jul. 24, 2023, U.S. Appl. No. 17/481,914, filed Sep. 22, 2022.

Advisory Action dated Oct. 5, 2023, U.S. Appl. No. 17/481,914, filed Sep. 22, 2022.

Examiner's Answer to Appeal Brief dated Feb. 23, 2024, U.S. Appl. No. 17/481,914, filed Sep. 22, 2022.

Office Action dated Feb. 13, 2024, U.S. Appl. No. 18/194,413, filed Mar. 31, 2023.

Keyerleber, John P., et al., "Secure Data Routing and Randomization," filed Nov. 13, 2019, U.S. Appl. No. 16/683,146.

Keyerleber, John P., et al., "Secure Data Routing and Randomization," filed Sep. 22, 2021, U.S. Appl. No. 17/481,914.

Andrews, John G., et al., "Secure Data Routing With Channel Resiliency," filed Mar. 31, 2023, U.S. Appl. No. 18/194,413.

(56) References Cited

OTHER PUBLICATIONS

Andrews, John G., et al., "Out of Band Key Exchange," filed Jun. 30, 2023, U.S. Appl. No. 18/345,819.

Andrews, John G., et al., "Network Traffic Obfuscation," filed Jun. 30, 2023, U.S. Appl. No. 18/345,829.

Andrews, John G., et al., "Endpoint Validation Security," filed Jun. 30, 2023, U.S. Appl. No. 18/345,837.

Andrews, John G., et al., "Secure Data Routing With Dynamic Packet Spoofing ," filed Jun. 30, 2023, U.S. Appl. No. 18/345,847.

Andrews, John G., et al., ""Secure Data Routing Andrandomization in Windows,"" filed Jul. 28, 2023, U.S. Appl. No. 18/361,721.

Keyerleber, John P., "Machine Learning Driven Network Traffic Obfuscation," filed Jan. 24, 2024, U.S. Appl. No. 18/421,960.

Keyerleber, et al., "Optimizing Network Traffic Obfuscation Based on Network Performance Using Reinforcement Learning," filed Jan. 24, 2024, U.S. Appl. No. 18/421,965.

Notice of Allowance dated Sep. 3, 2025, U.S. Appl. No. 18/345,819, filed Jun. 30, 2023.

Notice of Allowance dated Dec. 9, 2025, U.S. Appl. No. 18/361,721, filed Jul. 28, 2023.

Notice of Allowance dated Oct. 27, 2025, U.S. Appl. No. 18/345,837, filed Jun. 30, 2023.

Decision on Appeal dated Nov. 18, 2025, U.S. Appl. No. 17/481,914, filed Sep. 22, 2022.

* cited by examiner

200

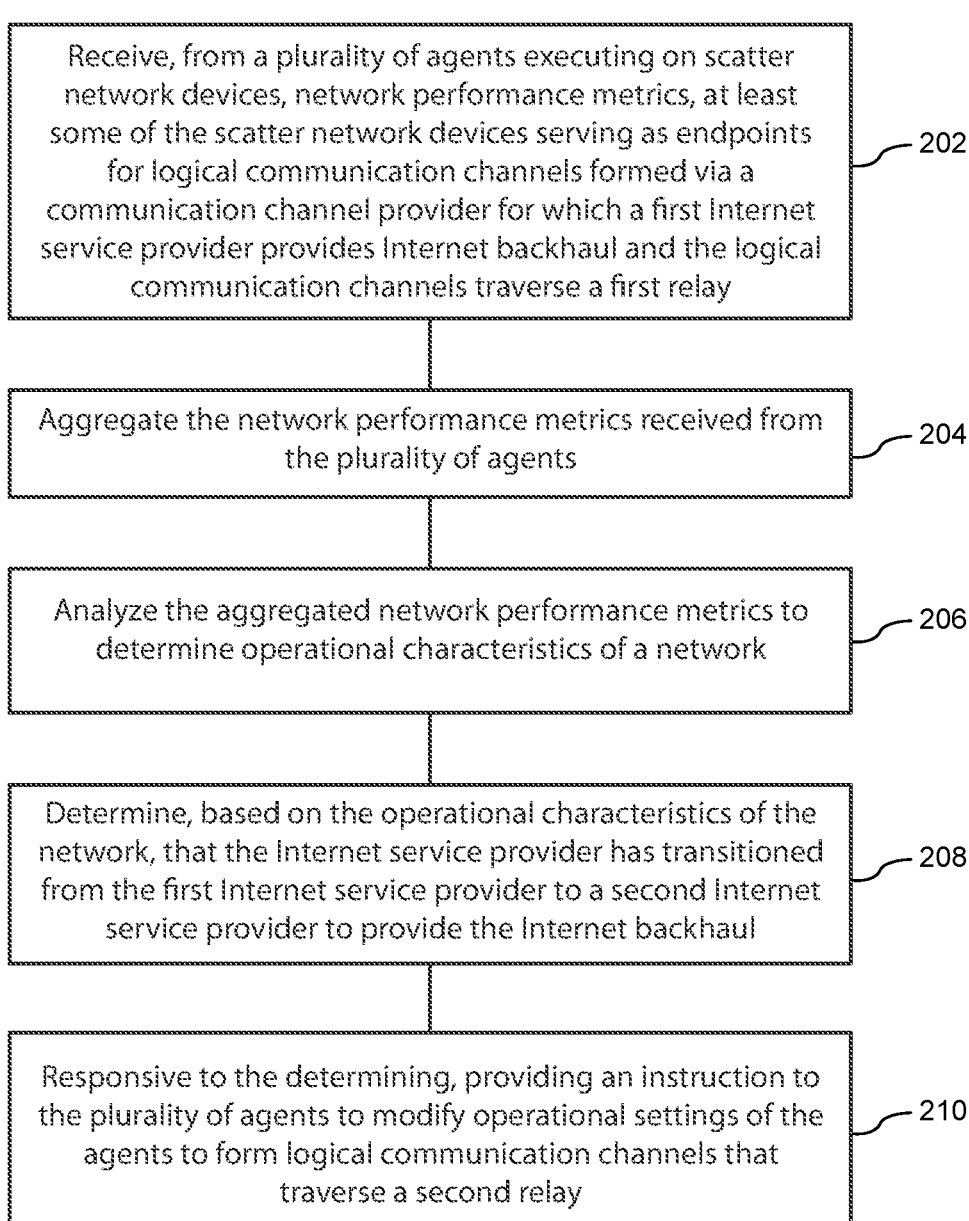

Receive, from a plurality of agents executing on scatter network devices, network performance metrics, at least some of the scatter network devices serving as endpoints for logical communication channels formed via a communication channel provider for which a first Internet service provider provides Internet backhaul and the logical communication channels traverse a first relay — 202

Aggregate the network performance metrics received from the plurality of agents — 204

Analyze the aggregated network performance metrics to determine operational characteristics of a network — 206

Determine, based on the operational characteristics of the network, that the Internet service provider has transitioned from the first Internet service provider to a second Internet service provider to provide the Internet backhaul — 208

Responsive to the determining, providing an instruction to the plurality of agents to modify operational settings of the agents to form logical communication channels that traverse a second relay — 210

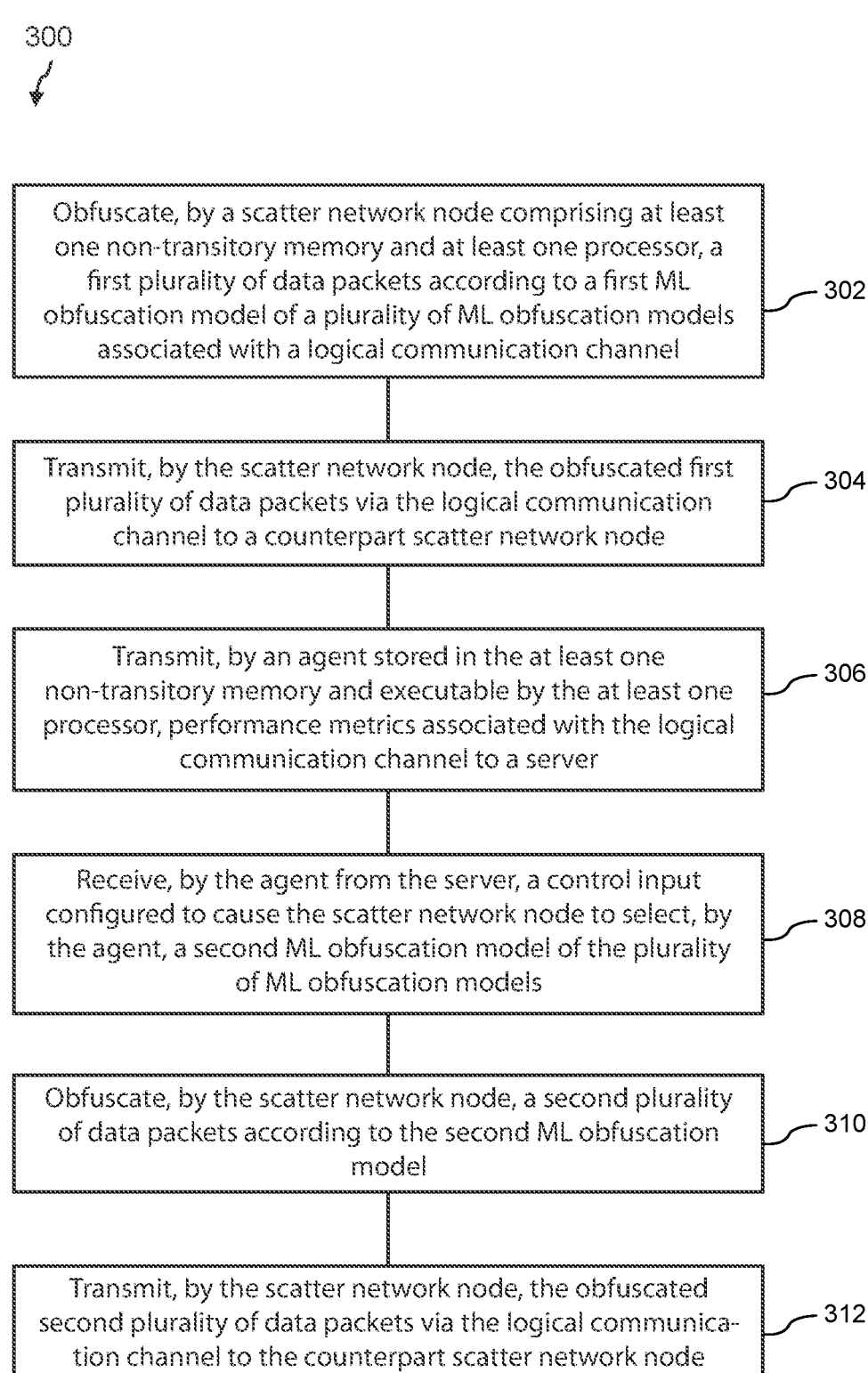

Obfuscate, by a scatter network node comprising at least one non-transitory memory and at least one processor, a first plurality of data packets according to a first ML obfuscation model of a plurality of ML obfuscation models associated with a logical communication channel — 302

Transmit, by the scatter network node, the obfuscated first plurality of data packets via the logical communication channel to a counterpart scatter network node — 304

Transmit, by an agent stored in the at least one non-transitory memory and executable by the at least one processor, performance metrics associated with the logical communication channel to a server — 306

Receive, by the agent from the server, a control input configured to cause the scatter network node to select, by the agent, a second ML obfuscation model of the plurality of ML obfuscation models — 308

Obfuscate, by the scatter network node, a second plurality of data packets according to the second ML obfuscation model — 310

Transmit, by the scatter network node, the obfuscated second plurality of data packets via the logical communication channel to the counterpart scatter network node — 312

FIG. 3

OPTIMIZING NETWORK TRAFFIC OBFUSCATION BASED ON AGGREGATED NETWORK PERFORMANCE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data transmitted between two computing systems may travel via defined paths or routes, through any of a variety of publicly accessible networks (e.g., the Internet), and may use any of a variety of media, such as Ethernet or fiber cabling. Data packets are generally forwarded across multiple routers to the requested IP address by the fastest path available at the time of transmission, with the packet's destination visible upon inspection. Whenever data is moved between two points, there is a potential risk of unauthorized access to that data by an eavesdropper or other unauthorized actor.

SUMMARY

In some examples, a method of optimizing network traffic obfuscation based on aggregated network performance includes receiving, from a plurality of agents executing on scatter network devices, network performance metrics, at least some of the scatter network devices serving as endpoints for logical communication channels formed via a communication channel provider for which a first Internet service provider provides Internet backhaul and the logical communication channels traverse a first relay. The method also includes aggregating the network performance metrics received from the plurality of agents. The method also includes analyzing the aggregated network performance metrics to determine operational characteristics of a network. The method also includes determining, based on the operational characteristics of the network, that the Internet service provider has transitioned from the first Internet service provider to a second Internet service provider to provide the Internet backhaul. The method also includes, responsive to the determining, providing an instruction to the plurality of agents to modify operational settings of the agents to form logical communication channels that traverse a second relay.

In some examples, a method of optimizing network traffic obfuscation based on aggregated network performance includes obfuscating, by a scatter network node comprising at least one non-transitory memory and at least one processor, a first plurality of data packets according to a first machine learning ("ML") obfuscation model of a plurality of ML obfuscation models associated with a logical communication channel. The method also includes transmitting, by the scatter network node, the obfuscated first plurality of data packets via the logical communication channel to a counterpart scatter network node. The method also includes transmitting, by an agent stored in the at least one non-transitory memory and executable by the at least one processor, performance metrics associated with the logical communication channel to a server. The method also includes receiving, by the agent from the server, a control input configured to cause the scatter network node to select, by the agent, a second ML obfuscation model of the plurality of ML obfuscation models. The method also includes obfuscating, by the scatter network node, a second plurality of data packets according to the second ML obfuscation model. The method also includes transmitting, by the scatter network node, the obfuscated second plurality of data packets via the logical communication channel to the counterpart scatter network node.

In some examples, a server includes at least one non-transitory memory, at least one processor, and a network traffic obfuscation application stored in the at least one non-transitory memory. When executed by the at least one processor, the network traffic obfuscation application receives, from a plurality of agents executing on scatter network devices, network performance metrics for a plurality of logical communication channels established among a plurality of communication mediums, aggregates the network performance metrics received from the plurality of agents, analyzes the aggregated network performance metrics via machine learning processing to determine operational characteristics of a network, determines that at least one of the operational characteristics is less than a threshold, responsive to determining that the at least one of the operational characteristics is less than the threshold, determines a modification to operation of at least one of the plurality of agents to increase the operational characteristics, and transmits the modification to the scatter network devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is a flow chart of a method according to an example of the disclosure.

FIG. 3 is a flowchart of a method according to an example of the disclosure.

DETAILED DESCRIPTION

Figure 1A:
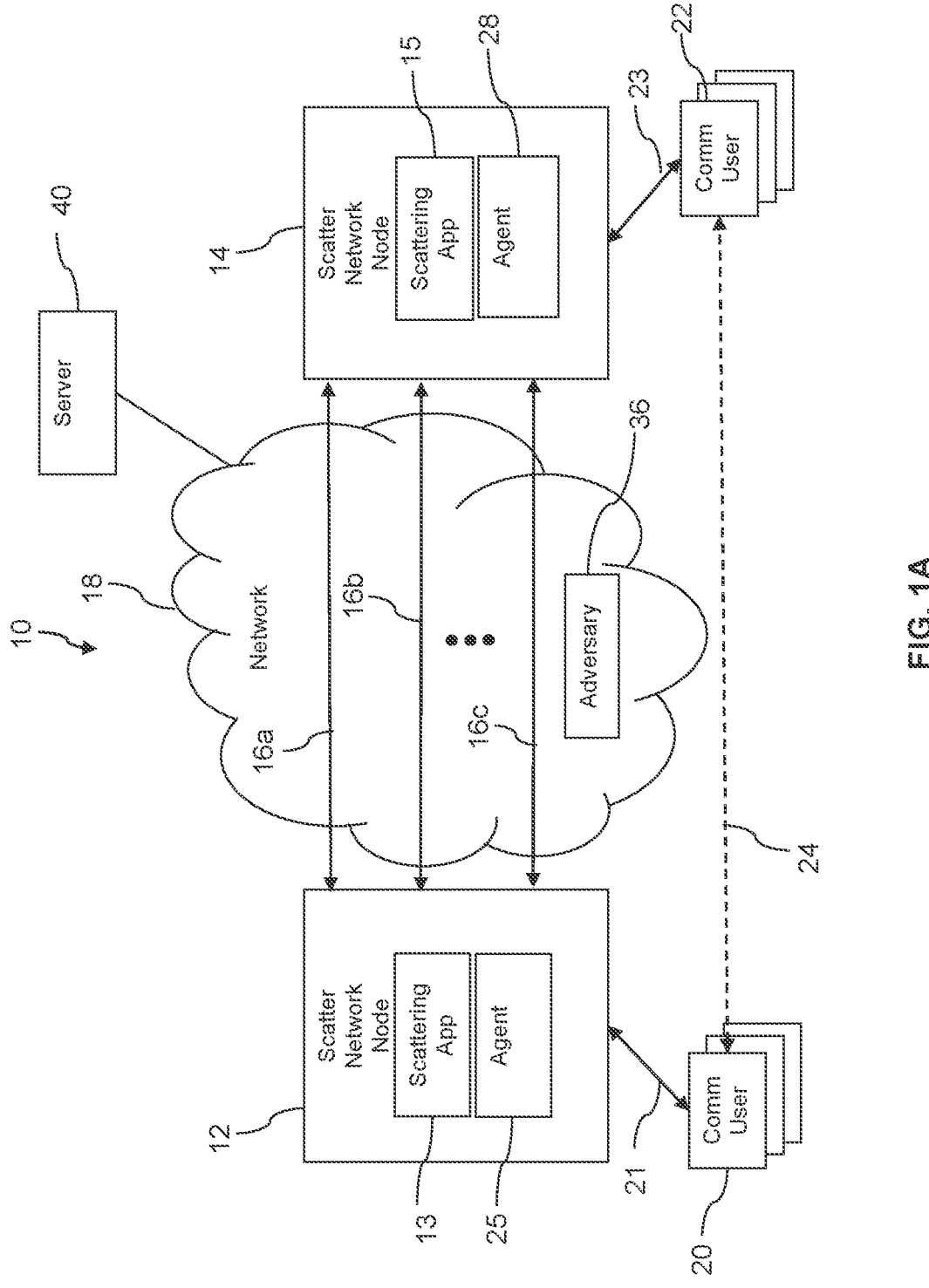
FIG. 1A is a block diagram of a communication system according to an example of the disclosure.

It should be understood at the outset that although illustrative implementations of one or more examples are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

To enable secure data routing, communication between a source and a destination via the Internet or other communication network may be randomly scattered over a plurality of logical communication channels by a collaborating pair of scatter network nodes. The source may be a first user device such as a mobile phone or a laptop computer; the destination may be a second user device such as a mobile phone or a laptop computer. Alternatively, the source may be the first user device and the destination may be a server application such as a social networking application executing on computer system or in a cloud computing environment or a financial services application executing on a computer system or in a cloud computing environment. For further details of scattering network communications and scattered data, see U.S. Pat. No. 11,153,276 B1 issued Oct. 19, 2021, titled "Secure Data Routing and Randomizing" by John P. Keyerleber, and U.S. patent application Ser. No. 18/194,413, filed Mar. 31, 2023, titled "Secure Data Routing and Randomizing with Channel Resiliency" by John G. Andrews, et al., which are hereby incorporated by reference herein in their entirety.

With any type of communication, there is a risk that an unauthorized party may attempt to access the transmitted data. Additionally, in some examples, an unauthorized party may make inferences, determine correlations, or otherwise glean meaningful information from the scattered data, even if that scattered data is encrypted. To combat these challenges, prior to scattering, dynamic packet spoofing or obfuscation may be used to enable more secure data routing. For example, a scatter network node may apply one or more obfuscation techniques to a data packet prior to transmission via a particular communication channel to have the data packet emulate other traffic being transmitted via that particular communication channel. This emulation helps reduce the likelihood of a data packet or communication channel being flagged as an anomaly by a potential adversary.

To determine criteria for obfuscating a data packet, a scatter provider may characterize various geographic areas, including a geographic area in which a first user device is located. To characterize the geographic area, the scatter provider may monitor or otherwise analyze network traffic flowing into, or out of, that geographic area. For example, the scatter provider may determine what form or forms of network traffic (e.g., email, media streaming, social media, etc.) occur most frequently in the geographic area, network traffic characteristics according to time of day, day of week, etc., a record type of the network traffic, packet size of the network traffic, request/reply characteristics of the network traffic, inter-packet timing between requests and replies of the network traffic, a number of data packets in a given communication session, a volume of data packets sent by a device, or sent to a destination, in a given unit of time, bandwidth, or the like. In at least some examples, the analysis may be performed based on network and application protocol headers of the network traffic being analyzed.

The above analysis may be performed via a machine-learning system, such as a system executing an artificial intelligence engine, that is capable of generating one or more predictive, or generative, channel models to a scatter network node. For example, the machine-learning system may, for each communication channel, determine multiple models for network traffic communicated via that respective communication channel. The models may include a protocol models, a session model, a characterization mode, and/or a routing model. The models individually, or collectively, may form a generative model.

In some examples, the generative model for a particular communication channel may correspond to a particular protocol. The generative model may provide packet sizing for the particular protocol, packet timing for the particular protocol, a header format for the particular protocol, and/or other packet characteristics consistent with the particular protocol to enable data packet obfuscation within the particular communication channel. In some cases, the generative model may be referred to as machine learning "ML" obfuscation model. The generative model may be capable of, based on the training performed by the machine-learning system based on the training data, predicting characteristics for a data packet substantially at runtime. For further details regarding the predictive, or generative, channel models used to obfuscate network traffic, see U.S. patent application Ser. No. 18/421,960, filed Jan. 24, 2024, titled "Machine Learning Driven Network Traffic Obfuscation" by John P. Keyerleber, et al., which is hereby incorporated by reference herein in its entirety.

An agent executing on endpoint devices (e.g., on the scatter network node or device) may observe current communication channel conditions and, using reinforcement learning, make intelligent adaptations based on reward functions. The reward functions may be based on a combination of obfuscation factors. Based on one or more observed communication channel conditions of a given communication channel, the agent may apply a different ML obfuscation model to data packets subsequently transmitted via the given communication channel. The agent may try different ML obfuscation models for communication channels and observe the reward functions and the communication channels' current conditions to settle on a best ML obfuscation model for each communication channel in terms of obfuscation and network performance. By applying different ML obfuscation models, observing current communication channel conditions, and observing the reward functions, the agent strives to improve or optimize obfuscation without impacting network performance. For further details regarding the optimization of network performance according to reward functions based on network performance, see U.S. patent application Ser. No. 18/421,965, filed Jan. 24, 2024, titled "Optimizing Network Traffic Obfuscation Based On Network Performance Using Reinforcement Learning" by John P. Keyerleber, et al., which is hereby incorporated by reference herein in its entirety.

In some examples, the agents are limited in their view of an overall network in which they operate. For example, for operational security or other logistical reasons, a particular agent may be provided with a subset of options to choose from in forming connections, performing obfuscation, or performing other operations. The subset may be selected from a set of options available in the overall network, available in a particular geographic region, or the like. In an example, a network operations center (NOC) may determine and provide the subset to the agent(s). Correspondingly, the agent(s) may report performance metrics to the NOC. For example, the NOC may provide the agents with a subset of options to choose from in scattering network communications and transmitting scattered data, including performing obfuscation. The agents may select from among those available options to perform scattered network communication, with or without obfuscation steps. The agent(s) may report various performance metrics to the NOC. For example, based on each unique combination of options selected by the agent(s) from the provided subset of options, the agent(s) may experience certain performance, which may be captured or recorded as various performance metrics. The agent(s) may report these performance metrics to the NOC. In this way, the agent(s), as well as other network devices such as relays, endpoints, or the like may function as sensors that monitor and report network performance to the NOC.

Based on the received performance metrics, the NOC may aggregate the performance metrics and make decisions based on the aggregated data. For example, the NOC may optimize the scattering of network communications or the obfuscation of network traffic based on an aggregated network performance determined based on the performance metrics received from the agents. In some examples, the NOC performs the optimization based on criteria not available to the agents. For example, one agent may not have knowledge of the performance of another agent. However, the NOC may have knowledge of performance of both of the agents, as well as other agents. Based on this aggregated knowledge, the NOC may be able to determine causes of network performance issues experienced by the agent(s). For example, based on the aggregated knowledge the NOC may be able to determine that network performance issues are regional in nature, are associated with a particular communication channel (e.g., satellite, cellular, broadband), are associated with a particular communication service provider (e.g., cellular provider A, cellular provider B, satellite provider A, etc.), or the like. Further, based on the aggregated knowledge the NOC may be able to determine that the network is under attack, such as a denial of service (DoS) attack, an adversary has gained or is attempting to gain access to the network, or the like.

Still further, based on the aggregated knowledge the NOC may be able to determine that network performance issues are traceable to certain communication channels, or communication channels traversing certain routes. For example, a cellular communication provider through which an agent may establish a cellular communication channel may perform Internet backhaul of communication via a first vendor. In an example, responsive to this, the NOC may provide certain agents with options optimized for compatibility with the first vendor. In another example, hardware devices, such as scatter relays, optimized for compatibility with the first vendor may be positioned along a logical communication path through which the cellular communication channel established with the cellular communication provider may traverse. The agent(s) may not have knowledge of these particular operational details of the network, and thus may be unable to trace network performance issues to these operational details. However, based on the aggregated data, as well as based on other network data obtained by the NOC, such as border gateway protocol (BGP) surveillance or any other suitable network monitoring, the NOC may determine that network performance issues for one or more agents are traceable to the cellular communication provider transitioning to perform Internet backhaul of communication via a second vendor. Because the agent(s) and/or the hardware devices were optimized for compatibility with the first vendor, performance of the agent(s) may decrease based on this change. The NOC may, based on its aggregated and whole-network view that is unavailable to the agent(s), determine that the network performance issues experience by one or more agents are traceable to the transition of the cellular communication provider from the first vendor to the second vendor.

Based on determined causes (actual, probable, or possible) of the network performance issues, the NOC may modify operation of the agents. For example, the NOC may instruct the agents to discontinue or begin the use of certain communication channels. In another example, the NOC may provide the agents with a modified profile for operation, such as a profile that may be optimized for compatibility with the second vendor. In another example, the NOC may provide the agents with a modified subset of options for performing scattering, performing obfuscation, or both. Still further, the NOC may stand down, disable, or deprovision first hardware devices and stand up, enable, or provision second hardware devices, such as hardware devices optimized for compatibility with the second vendor. In other examples, the NOC may provide the agents with information to modify the weightings of various criteria in network performance reward functions, to modify the weightings in criteria considered in performing network obfuscation, or the like. For example, based on performance metrics received from an agent, the NOC may, at a first time, modify the weightings of various criteria in network performance reward functions to emphasize obfuscation over bandwidth or latency. However, again based on the performance metrics received from the agent, the NOC may, at a second time, modify the weightings of various criteria in network performance reward functions to emphasize bandwidth or latency over obfuscation.

In some examples, based on aggregated performance metrics, or performance metrics for a particular agent, the NOC may determine recommended or preconfigured options for an agent. For example, the NOC may provide recommended options from the subset of available options at a particular agent, where the recommended options are determined by the NOC to have a probability greater than a threshold amount of providing a desired performance level based on performance metrics received from other similarly situated (geographically, operationally, etc.) agents.

In some examples, the NOC makes determinations based on the aggregated performance metrics and/or other network data obtained by the NOC according to statistical analysis. For example, the NOC determines whether exhibited performance characteristics represented in the performance metrics are within, or outside, of a particular number of standard deviations of average, programmed, expected, or other performance parameters. Based on the statistical analysis, the NOC may determine and/or provide recommendations or other control points for agents on a micro (e.g., individual agent) scale to macro (e.g., regional or whole network) scale. In other examples, the NOC implements artificial intelligence, reinforcement learning, or other machine learning processing to make determinations. For example, the NOC may implement a machine learning system that analyzes performance metrics, aggregated performance metrics, or other network data to determine and/or provide recommendations or other control points for agents on a micro scale to macro scale.

In some examples, the agent(s) may tune, refine, learn, or otherwise adapt policies for the establishment of logical communication channels, optimized obfuscation settings for certain regions, logical communication channels, or the like, or other operational characteristics. The agent(s) may transmit these learned policies to the NOC. In some examples, responsive to a new agent being provisioned, stood up, or otherwise implemented in the network, the NOC may provide that new agent with one or more of the learned policies received from other agents. For example, the learned policies provided to the new agent may be from other agents located in a same region as the new agent, from other agents operationally positioned similarly to the new agent, or the like. In some examples, the learned policies may provide the new agent with a recommended starting point for establishing logical communication settings, performing obfuscation, or the like that is improved, such as with respect to reward function scoring, in comparison to examples that lack these learned policies.

Turning now to FIG. 1A, a communication system 10 is described. In an example, the system 10 comprises a first scatter network node 12 that executes a first scattering application 13 and a second scatter network node 14 that executes a second scattering application 15. In an example, the first scattering application 13 is a first instance and the second scattering application 15 is a second instance of the same scattering application. In another example, however, the first scattering application 13 may be different from the second scattering application 15, for example the first scattering application 13 may be configured to play a client role while the second scattering application 15 may be configured to play a server role.

The scatter network node 12 and the scatter network node 14 may each be implemented as separate computer systems, for example server computers. Computer systems are described further hereinafter. One or both of the scatter network nodes 12, 14 may be implemented as a smart phone, a wearable computer, a headset computer, a laptop computer, a tablet computer, or a notebook computer. One of the scatter network nodes 12, 14 may be implemented as one or more virtual servers executing in a cloud computing environment.

The scattering applications 13, 15 comprise executable logic instructions that comprise scripts, compiled high-level language code, assembly language instructions, and/or interpreted language code. The scattering applications 13, 15 may be provided as shell scripts, complied C language code, compiled C++ language code, JAVA code, and/or some other kind of logic instructions. In an example, compiled C language code is used to implement the logic instructions of the scattering applications 13, 15 and provides access to powerful operating system calls and greater control of the operations on the scatter network nodes 12, 14 than scripts may provide. The scattering applications 13, 15 may also comprise data such as configuration data and/or provisioning data, for example provisioning data that defines logical communication channels and associations of user devices to logical communication channels.

In an example, the scatter network nodes 12, 14 collaborate with each other to establish a plurality of logical communication channels 16 by which they communicate with each other via a network 18. The network 18 may comprise one or more private networks, one or more public networks, or a combination thereof. In an example, the network 18 comprises the Internet. FIG. 1A shows a first logical communication channel 16*a*, a second logical communication channel 16*b*, and a third logical communication channel 16*c*, but it is understood that the scatter network nodes 12, 14 may establish any number of logical communication channels 16, for example 2, 3, 4, 5, 6, 7, 8, 9, 10, 15, 16, 20, 25, 27, 30, 32, 64, 138, 256, 1024, 4096, or some other number of logical communication channels 16. In some examples, the logical communication channel 16*a* is established via a first communication medium (e.g., cellular, broadband, satellite, wireless, etc.) and the logical communication channel 16*b* is established via a second communication medium. In other examples, the logical communication channels 16*a*, 16*b* are established via a second communication medium.

Each logical communication channel 16 may comprise a data communication link that may be considered as an IP communication path. Each logical communication channel 16 is bidirectional: data packets may flow from the first scatter network node 12 to the second scatter network node

14 via the logical communication channels 16; and data packets may flow from the second scatter network node 14 to the first scatter network node 12 via the logical communication channels 16. Each logical communication channel 16 may pass through various network nodes within the network 18. Some of the network nodes that the logical communication channels 16 pass through may include simple scatter relays and/or advanced scatter relays. The data communication passing from the first scatter network node 12 to the second scatter network node 14 or vice versa from the second scatter network node 14 to the first scatter network node 12 is treated within the network 18 as IP datagrams.

In an example, the communication between the first scatter network node 12 and the second scatter network node 14 is encrypted. For example, a data portion of an application datagram encapsulated in a data portion of the IP datagrams may be encrypted. For example, a data portion of an application datagram and selected parts of a header portion of the application datagram encapsulated in the data portion of the IP datagrams may be encrypted. In some examples, the encryption may cause the encrypted portions of the communication to take on a pseudorandom appearance such that the encrypted portions of the communication may be indistinguishable from random data or random noise. In some examples, the encryption may cause the encrypted portions of the communication to become, or be formatted as, a padded uniform random blob (PURB). A payload of the communication may be implemented as a PURB. Implementing the payload of the communication as a PURB may render metadata data of the communication indiscernible from payload data of the communication without decryption.

In an example, the communication between the first scatter network node 12 and the second scatter network node 14 may be considered to flow over a virtual private network (VPN). In some contexts, the scatter network nodes 12, 14 may be said to establish a scatter network via the logical communication channels 16.

A first communication user device 20 may establish a first local communication link 21 with the first scatter network node 12. A second communication user device 22 may establish a second local communication link 23 with the second scatter network node 14. The communication user devices 20, 22 may desire to communicate with each other via an application layer link 24 that is implemented via the scatter network nodes 12, 14 that provide network layer communication links (IP datagram traffic) via the network 18. Note that the dotted line 24 indicates that the application layer link is conceptual in nature and that the actual communication path between the communication user devices 20, 22 passes through the scatter network nodes 12, 14 and the network 18. The first and second local communication links 21, 23 may be insecure and may not carry encrypted data packets. For example, the IP datagrams sent by the first communication user device 20 may designate the true IP address of the first communication user device 20, and the IP datagrams sent by the second communication user device 22 may designate the true IP address of the second communication user device 22. It may be undesirable to send IP datagrams that include the true IP addresses of communication user devices 20, 22 via the network 18 because an adversary system 36 may be sniffing or otherwise monitoring the data traffic in the network 18 and identify these user devices 20, 22. The scatter network nodes 12, 14 hide the true IP addresses of the communication user devices 20, 22.

In an example, in addition to the first scattering application 13, the first scatter network node 12 executes a first agent 25. The first scatter network node 12 may also comprise various data associated with ML obfuscation models and/or reward functions, such as stored in a non-transitory memory of the first scatter network node 12. While represented as individual components, in some examples, the functionality of the first scattering application 13 and the first agent 25 may reside within a combined component executing on the first scatter network node 12.

In an example, in addition to the second scattering application 15, the second scatter network node 14 executes a second agent 28. The second scatter network node 14 may also comprise ML obfuscation models and/or reward functions, such as stored in a non-transitory memory of the second scatter network node 14. While represented as individual components, in some examples, the functionality of the second scattering application 15 and the second agent 28 may reside within a combined component executing on the second scatter network node 14.

The ML obfuscation models may be applied to data packets prior to transmission via one of the logical communication channels 16 to obfuscate the data packets such that they look like other traffic being transmitted via that logical communication channel 16, or other traffic present that may be present in the network 18. One or more of the ML obfuscation models may be associated with one or more of the logical communication channels 16. In some examples, each ML obfuscation model corresponds to a particular protocol. Each ML obfuscation model may provide packet sizing for a corresponding protocol, packet timing for the corresponding protocol, a header format for the corresponding protocol, and/or other packet characteristics consistent with the corresponding protocol to enable data packet obfuscation within a given logical communication channel 16. In an example, the ML obfuscation models may include weightings such that a first consideration in obfuscation decisions may be given priority over a second consideration in obfuscation decisions, or vice versa.

In an example, each of the reward functions is associated with one logical communication channel 16. The reward functions may be based on a combination of obfuscation factors. In some examples, the reward functions may be based on throughput, latency, bandwidth, and/or other network performance factors. The reward functions may include a plurality of components. For example, the plurality of components may comprise a channel level obfuscation component, a device level obfuscation component, and/or another obfuscation component. The plurality of components may also include a network performance component. In an example, the channel level obfuscation component evaluates how well the actual obfuscation matches the applied ML obfuscation model. The device level obfuscation component may evaluate how well communications are being scattered by the scatter network node 12, 14.

In an example the plurality of components of the reward functions are updated periodically. For example, the plurality of components of the reward functions may be updated after a certain amount of time (e.g., after 1 minute, 5 minutes, 15 minutes, or some other amount of time) or after an event (e.g., in response to a performance degradation below a threshold, after there is a change to a different ML obfuscation model, or another event). In some examples, at least some of the processing to update the plurality of components of the reward functions may be performed by a server 40. The server 40 may be a computer system, such as a server, implemented in a NOC. Computer systems are described further hereinafter. In some examples, the processing may be performed based on performance metrics reported by the scatter network node 12, such as via the agent 25, or aggregated performance metrics provided by multiple agents, such as the agents 25, 28 of the scatter network nodes 12, 14, respectively.

The scatter network nodes 12, 14 may receive data packets from communication user devices 20, 22. For example, the first scatter network node 12 may receive data packets from the first communication user device 20 and the second scatter network node 14 may receive data packets from the second communication user device 15. The scattering application 13, 15 may select one of the logical communication channels 16 for transmission of a received data packet. The scattering application 13, 15 may randomly select one of the logical communication channels 16.

The scatter network node 12, 14 may obfuscate the received data packets based on one of the ML obfuscation models associated with the selected logical communication channel 16. The obfuscation may include modifying the data packets to be within a particular size range, sending the data packets according to a particular inter-packet timing, modifying a header of the data packets, or some other type of obfuscation. In an example, the applied ML obfuscation model is associated with a particular protocol. In such an example, the obfuscation includes one or more of modifying a size of the data packets to be within a particular size range consistent with the particular protocol, sending the data packets according to a particular inter-packet timing consistent with the particular protocol, or modifying a header of each of the data packets to be consistent with the particular protocol. Modifying a size a data packet may comprise padding the data packet or making the data packet smaller by selecting only a portion of the data packet. Sending data packets according to a particular inter-packet timing may comprise sending dummy packets. In an example, after the data packets are obfuscated based on the applied ML obfuscation model, the scatter network node 12, 14 transmits the obfuscated data packets to a counterpart scatter network node.

The agents 25, 28 may observe current communication channel conditions of the logical communication channels 16 and make adaptations about which ML obfuscation model to apply to a given logical communication channel 16, such as based on the reward functions. The agents 25, 28 may observe or learn what types of endpoints appear to be more effective, what ports appear to be more available/less blocked, what protocols seem to be less throttled, and/or other conditions. That agents 25, 28 may observe network performance characteristics of each of the logical communication channels 16 such as throughput, latency, bandwidth, and/or other network performance factors. In an example, the agents 25, 28 provide the observed current communication channel conditions, network performance characteristics, and other data to the server 40. In this way, the scatter network node 12, 14, agents 25, 28, etc. may function as sensors that provide sensed or observed network data to the server 40.

In an example, based on one or more observed communication channel conditions of a given logical communication channel 16, the agent 25, 28 may apply a different ML obfuscation model to data packets subsequently transmitted via the given logical communication channel 16. In another example, the server 40 may perform processing, such as on the performance data provided by the agents 25, 28, and provide control data that causes the agent 25, 28 may apply a different ML obfuscation model to data packets subsequently transmitted via the given logical communication channel 16.

As described above, in some examples, the server 40 receives current communication channel conditions, network performance characteristics, and/or other data (collectively referred to as performance metrics) from the scatter network node 12, 14, agents 25, 28, scatter relays (not shown), etc. Based on the received data, the server 40 may perform various processing, such as statistical analysis, machine learning, or the like. In some examples, the server 40 may perform processing on the performance metrics on a per sensor basis (e.g., perform processing on the performance metrics for each device from which the performance metrics were received). In other examples, the server 40 may aggregate the performance metrics and perform processing on the aggregated data.

For example, the server 40 may have a view of the network 18 that is unavailable to the agents 25, 28. This view of the network 18 may enable the server 40 to make determinations which the agents 25, 28 may be unable to accurately make, such as related to causes of network performance issues, etc. For example, one agent 25, 28 may not have knowledge of the performance of the other agent 25, 28. However, the server 18 may have knowledge of performance of both of the agents 25, 28, as well as other agents (not shown). Based on this aggregated knowledge, the server 40 may be able to determine causes of network performance issues experienced by the agent 25, 28. For example, based on the aggregated knowledge the server 40 may be able to determine that network performance issues are regional in nature, are associated with a particular communication channel (e.g., affecting the logical communication channel 16a but not the logical communication channel 16b, or the like), are associated with a particular communication service provider (e.g., cellular provider A, cellular provider B, satellite provider A, or the like). Further, based on the aggregated knowledge the server 40 may be able to determine that the network 18, or a logical communication channel 16, is under attack, such as by the adversary 36, that the adversary 36 has gained or is attempting to gain access to the network or a logical communication channel 16, or the like.

Still further, based on the aggregated knowledge the server 40 may be able to determine that network performance issues are traceable to a certain logical communication channel 16, or a logical communication channel 16 traversing certain routes, or the like. For example, a cellular communication provider through which an agent 25, 28 may establish a logical communication channel 16 may perform Internet backhaul of communication via a first vendor. In an example, responsive to this, the server may provide the agents 25, 28 with options optimized for compatibility with the first vendor. In another example, hardware devices (not shown), such as scatter relays, optimized for compatibility with the first vendor may be positioned along a logical communication path through which the logical communication channel 16 established with the cellular communication provider may traverse. The agent 25, 28 may not have knowledge of these particular operational details of the network 18, and thus may be unable to trace network performance issues to these operational details. However, based on the aggregated data, as well as based on other network data obtained by the server 40, such as BGP surveillance or any other suitable network monitoring, the server 40 may determine that network performance issues for one or more of the agents 25, 28 are traceable to the cellular communication provider transitioning to perform Internet backhaul of communication via a second vendor. Because the agents 25, 28 and/or the hardware devices were optimized for compatibility with the first vendor, performance of the agent(s) may decrease based on this change. The server 40 may, based on its aggregated and whole-network view that is unavailable to the agents 25, 28, determine that the network performance issues experience by one or more of the agents 25, 28 are traceable to the transition of the cellular communication provider the first vendor to the second vendor.

Based on determined causes of the network performance issues, the server 40 may modify operation of the agents 25, 28. For example, the server 40 may instruct the agents 25, 28 to discontinue or begin the use of certain communication channels. In another example, the server 40 may provide the agents 25, 28 with a modified profile for operation, such as a profile that may be optimized for compatibility with the second vendor. In another example, the server 40 may provide the agents 25, 28 with a modified subset of options for performing scattering, performing obfuscation, or both. Still further, the server 40 may stand down, disable, or deprovision first hardware devices and stand up, enable, or provision second hardware devices, such as hardware devices optimized for compatibility with the second vendor. In other examples, the server 40 may provide the agents 25, 28 with information to modify the weightings of various criteria in network performance reward functions, to modify the weightings in criteria considered in performing network obfuscation, or the like. For example, based on performance metrics received from an agent 25, 28, the server 40 may, at a first time, modify the weightings of various criteria in network performance reward functions to emphasize obfuscation over bandwidth or latency. However, again based on the performance metrics received from the agent 25, 28, the server 40 may, at a second time, modify the weightings of various criteria in network performance reward functions to emphasize bandwidth or latency over obfuscation. In some examples, the decision of the server 40 to modify weightings of the various criteria the in-network performance reward functions of an agent 25, 28 may be further, or alternatively, based on geopolitical issues, customer request, a particular customer mission or use case, or the like.

In some examples, based on aggregated performance metrics, or performance metrics for a particular agent 25, 28, the server 40 may determine recommended or preconfigured options for an agent 25, 28. For example, the server 40 may provide recommended options from the subset of available options at a particular agent 25, 28, where the recommended options are determined by the server 40 to have a probability greater than a threshold amount of providing a desired performance level based on performance metrics received from other similarly situated (geographically, operationally, etc.) agents. In various examples, the server 40 processes the performance metrics via any suitable method, such as statistical analysis, machine learning, or the like.

Figure 1B:
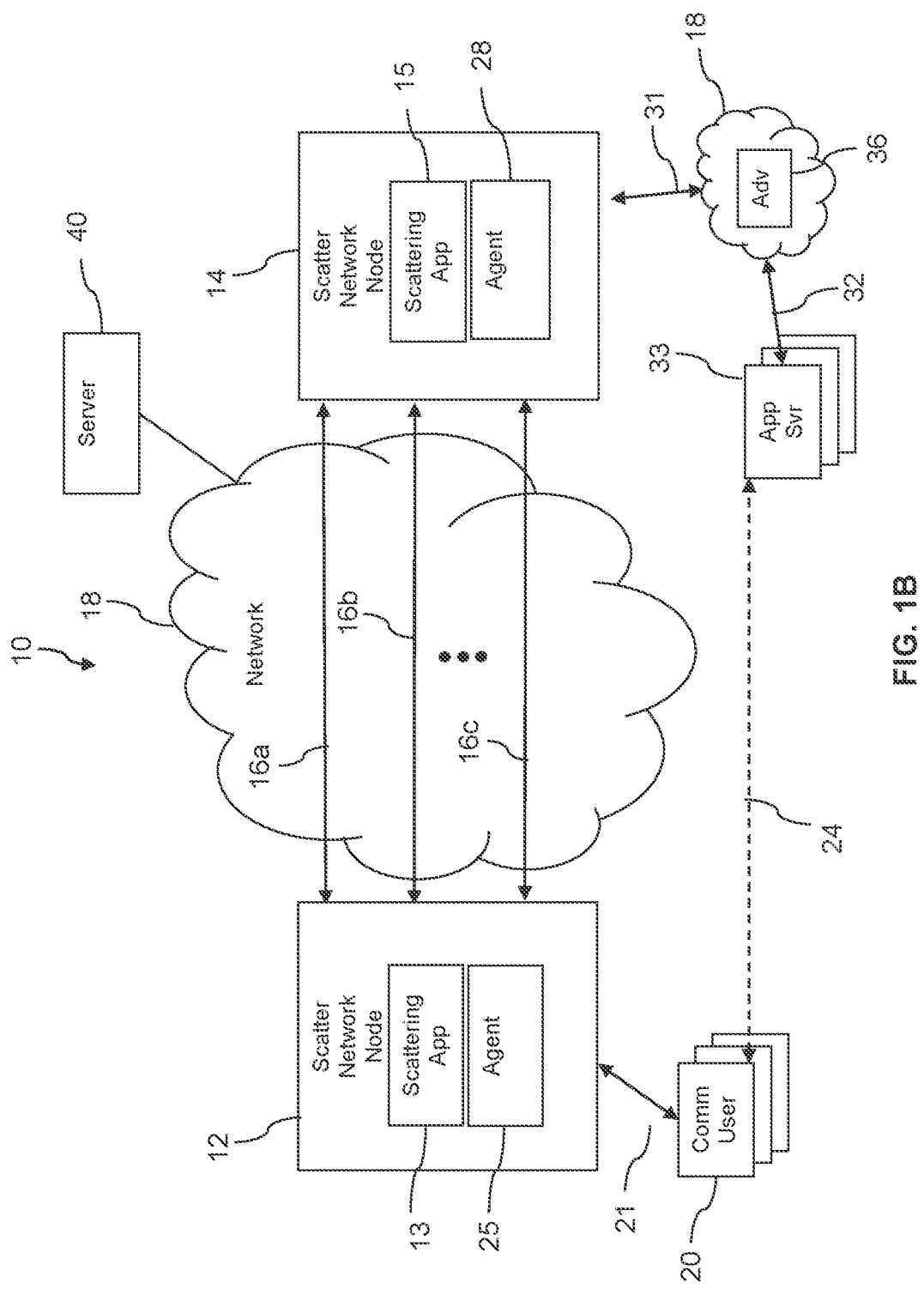
FIG. 1B is another block diagram of the communication system according to an example of the disclosure.

Turning now to FIG. 1B, an alternate view of the communication system 10 is described. The communication functionality provided by the scatter network nodes 12, 14 is general and applies to other communication scenarios than that illustrated and described with reference to FIG. 1A. Note that the network 18 is shown as two cloud images in FIG. 1B but these two clouds conceptually refer to the same network. It is illustrated in FIG. 1B to facilitate understanding of flow of communications. In FIG. 1B, the communicating end users may be considered to be the first communication user device 20 and an application server 33. Thus, the first communication user device 20 may communicate with the application server 33 via an application layer communication link 24 that is conceptual in nature. The first communication user device 20 may request content from and receive content from the application server 33 or send content to the application server 33 conceptually over the application layer communication link 24 but in fact via the first communication link 21, via the logical communication channels 16, via a third communication link 31 to the network 18, and from the network 18 via a fourth communication link 32 to the application server 33. It will be appreciated that the network 18 through which the logical communication channels 16 route is the same network 18 through which the second scatter network node 14 communicates with the application server 29 via communication links 31, 32, drawn separately here to support further understanding of the system 10.

As illustrated in FIG. 1B, the adversary 36 may be located so as to monitor communication between the network 18 and the application server 33. The adversary 36 may determine the true IP addresses of a communication port of the second scatter network node 14 and a communication port of the application server 33. Importantly, however, the adversary 36 is not able to determine the true IP address of the first scatter network node 12 or of the first communication user device 20, hence the adversary 36 is not readily able to determine an approximate location of the first communication user device 20 and/or of the first scatter network node 12.

With reference now to both FIG. 1A and FIG. 1B, the first logical communication channel 16a may be considered to be defined by an IP address and port number at the first scatter network node 12 and an IP address and port number at the second scatter network node 14. The term port number or port numbers refers to a transport communication layer port number or transport communication layer port numbers and may include well-known port numbers. In an example, the first scatter network node 12 and or the first scattering application 13 may define sockets to establish the communication ports at its end of the logical communication channels 16, and the second scatter network node 14 and/or the second scattering application 15 may define coordinate sockets to establish the communication ports at its end of the logical communication channels 16. Sockets are a well-known communication abstraction used for conducting data communication between computer systems over the Internet. In an example, the sockets may be user datagram protocol (UDP) type sockets. In an example, the sockets may be transmission control protocol (TCP) type sockets. In an example, a different intermachine communication abstraction may be used to implement the logical communication channels 16.

The first logical communication channel 16a is bidirectional: in a first communication event, the first scatter network node 12 may send an IP datagram via the first logical communication channel 16a to the second scatter network node 14 via the network 18, while in a second communication event, the second scatter network node 14 may send an IP datagram via the first logical communication channel 16a to the first scatter network node 12 via the network 18. The different logical communication channels 16 connect to the first scatter network node 12 at a different combinations of IP address, protocol, and port. For example, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and the first port number.

Alternatively, the first logical communication channel 16a may connect to the first scatter network node 12 at a first IP address and first port number; the second logical communication channel 16b may connect to the first scatter network node 12 at the first IP address and a second port number; and the third logical communication channel 16c may connect to the first scatter network node 12 at the first IP address and a third port number. Alternatively, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and a second port number. The logical communication channels 16 may attach to the second scatter network node 14 by other combinations of IP address/port number pairs, IP protocols, or the like.

It is noted that a logical communication channel 16 may be defined by any unique combination of (A) an IP address associated with the first scatter network node 12, (B) a port number at the first scatter network node 12, (C) an IP address associated with the second scatter network node, (D) a port number at the second scatter network node, and (E) the IP protocol used between the first scatter network node 12 and the second scatter network node 14. Thus, the first logical channel 16a could be defined by a first IP address associated with the first scatter network node 12, a first port number at the first scatter network node 12, a second IP address associated with the second scatter network node 14, and a second port number at the second scatter network node; the second logical channel 16b could be defined by the first IP address associated with the first scatter network node 12, the first port number at the first scatter network node 12, a third IP address associated with the second scatter network node 14, and the second port number at the second scatter network node; and the third logical channel 16c could be defined by the first IP address associated with the first scatter network node 12, the first port number at the first scatter network node 12, the second IP address associated with the second scatter network node 14, and a third port number at the second scatter network node. These are examples of unique IP addresses and port numbers that uniquely define logical communication channels 16, but it is understood there are many alternative combinations.

Turning now to FIG. 2, an example method 200 is described. In an example, the method 200 is a method of optimizing network traffic obfuscation based on aggregated network performance.

At operation 202, a server (e.g., server 40) comprising at least one non-transitory memory and at least one processor receives, from a plurality of agents (e.g., agents 25, 28) executing on scatter network devices (e.g., scatter network nodes 12, 14), network performance metrics. At least some of the scatter network devices serve as endpoints for logical communication channels (e.g., logical communication channels 16) formed via a communication channel provider for which a first Internet service provider provides Internet backhaul and the logical communication channels traverse a first relay. At operation 204, the server aggregates the network performance metrics received from the plurality of agents. At operation 206, the server analyzes the aggregated network performance metrics to determine operational characteristics of a network.

At operation 208, the server determines, based on the operational characteristics of the network, that the Internet service provider has transitioned from the first Internet service provider to a second Internet service provider to provide the Internet backhaul. At operation 210, responsive to the determining, the server provides an instruction to the plurality of agents to modify operational settings of the agents to form logical communication channels that traverse a second relay Turning now to FIG. 3, an example method 300 is described. In an example, the method 300 is a method of optimizing network traffic obfuscation based on aggregated network performance. At operation 302, a scatter network node (e.g., scatter network node 12, 14) comprising at least one non-transitory memory and at least one processor obfuscates a first plurality of data packets according to a first machine learning ("ML") obfuscation model of a plurality of ML obfuscation models associated with a logical communication channel (e.g., logical communication channel 16). At operation 304, the scatter network node transmits the obfuscated first plurality of data packets via the logical communication channel to a counterpart scatter network node.

At operation 306, an agent (e.g., agent 25, 28) stored in the at least one non-transitory memory and executable by the at least one processor, transmits performance metrics associated with the logical communication channel to a server (e.g., the server 40). At operation 308, the agent receives a control input from the server. The control input is configured to cause the scatter network node to select, by the agent, a second ML obfuscation model of the plurality of ML obfuscation models. At operation 310, the scatter network node obfuscates a second plurality of data packets according to the second ML obfuscation model. At operation 312, the scatter network node transmits the obfuscated second plurality of data packets via the logical communication channel to the counterpart scatter network node.

Figure 4:
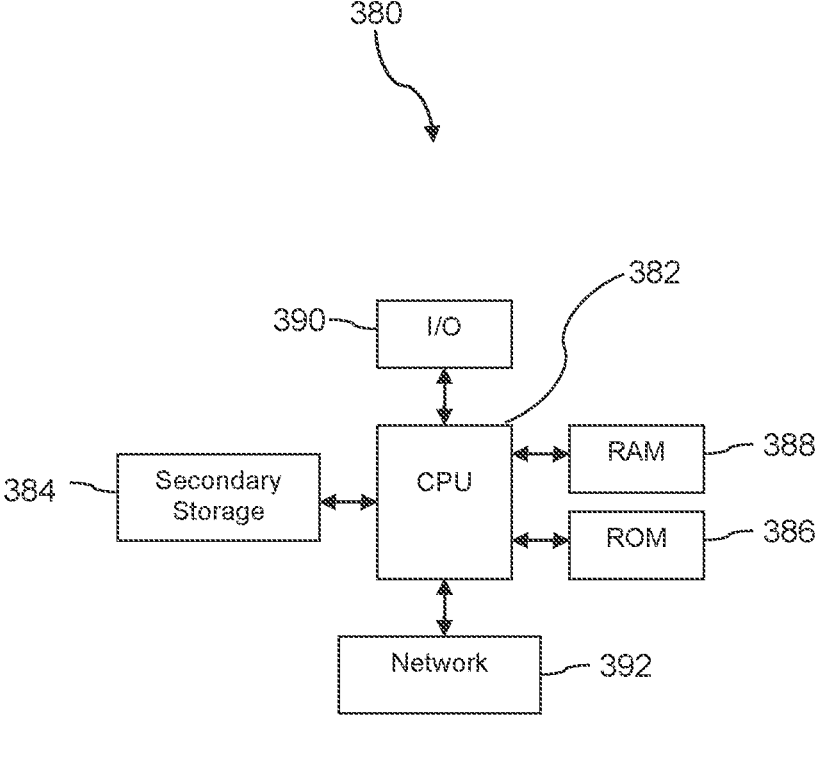
FIG. 4 is a block diagram of a computer system according to an example of the disclosure.

FIG. 4 illustrates a computer system 380 suitable for implementing one or more examples disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may be referred to as physical interfaces or physical network interfaces. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards such as a WiFi physical interface, radio transceiver cards such as a wireless wide area network (WWAN) such as a cellular network physical interface, and/or other well-known network devices. A network connectivity device 392 may comprise an Ethernet-to-satellite wireless link physical interface. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an example, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an example, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an example, virtualization software may be employed by the computer system 380 to provide the functionality of a number of servers that is not directly bound to the number of computers in the computer system 380. For example, virtualization software may provide twenty virtual servers on four physical computers. In an example, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an example, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM example of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several examples have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various examples as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of optimizing network traffic obfuscation based on aggregated network performance, comprising:
   receiving, from a plurality of agents executing on scatter network devices, network performance metrics, at least some of the scatter network devices serving as endpoints for logical communication channels formed via a communication channel provider for which a first Internet service provider provides Internet backhaul and the logical communication channels traverse a first relay;
   aggregating the network performance metrics received from the plurality of agents;
   analyzing the aggregated network performance metrics to determine operational characteristics of a network;
   determining, based on the operational characteristics of the network, that the Internet service provider has transitioned from the first Internet service provider to a second Internet service provider to provide the Internet backhaul; and
   responsive to the determining, providing an instruction to the plurality of agents to modify operational settings of the agents to form logical communication channels that traverse a second relay.

2. The method of claim 1, further comprising analyzing the aggregated network performance metrics according to statistical analysis.

3. The method of claim 1, further comprising analyzing the aggregated network performance metrics according to machine learning processing.

4. The method of claim 1, wherein the first relay is optimized for the first Internet service provider, and wherein the second relay is optimized for the second Internet service provider.

5. The method of claim 1, further comprising determining that the Internet service provider has transitioned from the first Internet service provider to the second Internet service provider to provide the Internet backhaul responsive to determining that a plurality of scatter network devices each having logical communication channels that traverse the first relay are experiencing network performance issues.

6. The method of claim 1, wherein the instruction is a profile according to which the agents form the logical communication channels.

7. A method of optimizing network traffic obfuscation based on aggregated network performance, comprising:
   obfuscating, by a scatter network node comprising at least one non-transitory memory and at least one processor, a first plurality of data packets according to a first machine learning ("ML") obfuscation model of a plurality of ML obfuscation models associated with a logical communication channel;
   transmitting, by the scatter network node, the obfuscated first plurality of data packets via the logical communication channel to a counterpart scatter network node;
   transmitting, by an agent stored in the at least one non-transitory memory and executable by the at least one processor, performance metrics associated with the logical communication channel to a server;
   receiving, by the agent from the server, a control input configured to cause the scatter network node to select, by the agent, a second ML obfuscation model of the plurality of ML obfuscation models;
   obfuscating, by the scatter network node, a second plurality of data packets according to the second ML obfuscation model; and
   transmitting, by the scatter network node, the obfuscated second plurality of data packets via the logical communication channel to the counterpart scatter network node.

8. The method of claim 7, wherein the performance metrics associated with the logical communication channel indicate that performance of the logical communication channel is less than a threshold.

9. The method of claim 8, wherein, responsive to the performance of the logical communication channel being less than the threshold, the method further comprises:
   processing, by the server and via a machine learning process, the performance metrics to determine a cause of the performance of the logical communication channel being less than the threshold;
   determining by the server, an operational modification for the agent to increase the performance of the logical communication channel; and
   providing the operational modification to the agent.

10. The method of claim 9, wherein the operational modification is a change from the first ML obfuscation model to the second ML obfuscation model.

11. The method of claim 9, wherein the operational modification is a change to a profile according to which the agent forms the logical communication channel.

12. The method of claim 9, wherein the operational modification is a change from the logical communication channel to a second logical communication channel.

13. The method of claim 9, wherein the operational modification is a change to a weighting of a parameter of a rewards function according to which operation of the scatter network element is scored.

14. The method of claim 9, wherein the operational modification is a change to routing of the logical communication channel.

15. A server, comprising:
   at least one non-transitory memory;
   at least one processor;

a network traffic obfuscation application stored in the at least one non-transitory memory that, when executed by the at least one processor:

receives, from a plurality of agents executing on scatter network devices, network performance metrics for a plurality of logical communication channels established among a plurality of communication mediums;

aggregates the network performance metrics received from the plurality of agents;

analyzes the aggregated network performance metrics via machine learning processing to determine operational characteristics of a network;

determines that at least one of the operational characteristics is less than a threshold;

responsive to determining that the at least one of the operational characteristics is less than the threshold, determines a modification to operation of at least one of the plurality of agents to increase the operational characteristics; and transmits the modification to the scatter network devices.

16. The server of claim 15, wherein the network performance metrics include bandwidth, latency, throughput, and obfuscation characteristics.

17. The server of claim 15, wherein the modification is a change to a weighting of a parameter of a rewards function according to which operation of the scatter network devices are scored.

18. The server of claim 15, wherein the modification is a change to a profile according to which at least some of the plurality of agents form logical communication channels.

19. The server of claim 15, wherein the modification is a change from routing via a first network relay to routing via a second network relay.

20. The server of claim 15, wherein executing the application further causes the at least one processor to perform border gateway protocol surveillance of a network in which at least some of the scatter network devices operate.

* * * * *